(12) United States Patent
Sarokhan et al.

(10) Patent No.: US 12,420,896 B2
(45) Date of Patent: Sep. 23, 2025

(54) FLOATING CHARGING STATION FOR AN ELECTRIC BOAT

(71) Applicant: OCEAN POWER TECHNOLOGIES, INC., Monroe Township, NJ (US)

(72) Inventors: Joseph Sarokhan, Basking Ridge, NJ (US); Joshua Mehlman, Monroe Township, NJ (US); Ethan Butler, Monroe Township, NJ (US); David Goldstein, Washington, NJ (US)

(73) Assignee: OCEAN POWER TECHNOLOGIES, INC., Houston, TX (US)

( * ) Notice: Subject to any disclaimer, the term of this patent is extended or adjusted under 35 U.S.C. 154(b) by 0 days.

(21) Appl. No.: 18/936,528

(22) Filed: Nov. 4, 2024

(65) Prior Publication Data

US 2025/0058858 A1    Feb. 20, 2025

Related U.S. Application Data

(63) Continuation of application No. PCT/US2024/021635, filed on Mar. 27, 2024.
(Continued)

(51) Int. Cl.
*B63B 35/44* (2006.01)
*B60L 53/12* (2019.01)
(Continued)

(52) U.S. Cl.
CPC .............. *B63B 35/44* (2013.01); *B60L 53/12* (2019.02); *B60L 53/16* (2019.02); *B60L 53/35* (2019.02);
(Continued)

(58) Field of Classification Search
CPC .......... B60L 53/12; B60L 53/16; B60L 53/35; B60L 53/53; B60L 53/57; B60L 53/66; B63B 2035/4486; B63B 35/44
See application file for complete search history.

(56) References Cited

U.S. PATENT DOCUMENTS

| 4,271,668 A | 6/1981 | McCormick |
| 7,051,668 B1 | 5/2006 | Quinto |

(Continued)

FOREIGN PATENT DOCUMENTS

| CN | 111874194 A | 7/2020 |
| CN | 114954843 A | 8/2022 |

(Continued)

OTHER PUBLICATIONS

US Department of Energy, Underwater Vehicle Charging, Powering the Blue Economy: Exploring Opportunities for Marine Renewable Energy in Marine Markets, Apr. 2019, pp. 22-27.

(Continued)

*Primary Examiner* — David V Henze-Gongola
(74) *Attorney, Agent, or Firm* — Jonathan Pierce; Derek V. Forinash; Porter Hedges LLP

(57) ABSTRACT

A system for charging electric vehicles on or near water includes a charging station and a shore station. The charging station comprises an aquatic structure which can be attached and/or moored to a shore and/or the ground/bed of the body of water, and receptacles that are assembled around the aquatic structure and connected to it. The receptacles are preferably all water-proof, and collectively house various components for allowing the recharging of an electric vehicle. The shore station is remote and mechanically disconnected from the charging station. The shore station is at least partially, if not entirely, above water and attached to the shore of the body of water, for example to a quayside. The shore station includes communication means that complement the communication means of the charging station.

27 Claims, 2 Drawing Sheets

Related U.S. Application Data

(60) Provisional application No. 63/454,807, filed on Mar. 27, 2023.

(51) Int. Cl.
    *B60L 53/16* (2019.01)
    *B60L 53/35* (2019.01)
    *B60L 53/53* (2019.01)
    *B60L 53/57* (2019.01)
    *B60L 53/66* (2019.01)
    *H02J 50/10* (2016.01)

(52) U.S. Cl.
    CPC .............. *B60L 53/53* (2019.02); *B60L 53/57* (2019.02); *B60L 53/66* (2019.02); *B60L 2200/32* (2013.01); *B63B 2035/4486* (2013.01); *H02J 50/10* (2016.02)

(56) References Cited

U.S. PATENT DOCUMENTS

| | | |
|---|---|---|
| 7,410,395 B2 | 8/2008 | Kawai et al. |
| 9,587,620 B2 | 3/2017 | Rhinefrank et al. |
| 9,718,524 B2 | 8/2017 | Gasparoni |
| 10,669,000 B2 | 6/2020 | Mahmoudian et al. |
| 10,732,296 B1 | 8/2020 | Morin et al. |
| 10,933,958 B2 | 3/2021 | Sarokhan |
| 11,258,105 B2 | 2/2022 | Sarokhan |
| 11,542,913 B1 | 1/2023 | Hammagren et al. |
| 11,952,974 B2 | 4/2024 | Lenee-Bluhm et al. |
| 11,975,811 B2 | 5/2024 | Ulm et al. |
| 2008/0012344 A1 | 1/2008 | Buffard et al. |
| 2019/0353139 A1 | 11/2019 | Sheldon-Coulson et al. |
| 2020/0406765 A1* | 12/2020 | Mikalsen ................ B60L 53/30 |
| 2022/0403812 A1 | 12/2022 | Browne et al. |
| 2023/0151789 A1 | 5/2023 | Hammagren et al. |
| 2023/0399078 A1* | 12/2023 | Smith ..................... B63B 27/30 |
| 2024/0034443 A1* | 2/2024 | Podhola .................. B60L 53/80 |
| 2024/0217628 A1* | 7/2024 | Ito ........................... B60L 53/30 |

FOREIGN PATENT DOCUMENTS

| | | |
|---|---|---|
| EP | 2471707 A2 | 12/2010 |
| GB | 2340318 A | 2/2000 |
| JP | 61196179 A | 8/1986 |
| JP | 2017071266 A | 10/2015 |
| KR | 20160137889 A | 6/2014 |
| KR | 20230071387 A | 11/2021 |
| WO | 2017054796 A1 | 10/2015 |
| WO | 2021156812 A1 | 8/2021 |
| WO | 2022084675 A1 | 4/2022 |
| WO | 2022159030 A1 | 7/2022 |

OTHER PUBLICATIONS

Tech Markets Media Ltd., C-Power and Open Ocean Robotics to Test Innovative USV 'Data Muling' Concept During Demonstration of SeaRay Ocean Energy System, Jul. 25, 2024.

Northrop Grumman, Mission Unlimited: Inventing Autonomous Recharging of Unmanned Underwater Vehicles, 2024, 6 pages.

Jiaqi Hu et al. Design of a Docking & Charging Device for Unmanned Surface Vehicle (USV), 2023 IEEE 2nd International Conference on Electrical Engineering, Big Data and Algorithms (EEBDA), Abstract, Feb. 24-26, 2023.

University of Hawai'i System News, UH underwater vehicle charging station wins national competition, Jul. 30, 2020, 3 pages.

US Department of Energy, 2020-2021 Accomplishments Report Water Power Technologies Office, Mar. 2022, DOE/EE-2287, 55 pages.

USPTO, International Search Report and Written Opinion in parent application serial No. PCT/US24/21635, mailed Aug. 6, 2024, 15 pages.

* cited by examiner

FLOATING CHARGING STATION FOR AN ELECTRIC BOAT

CROSS-REFERENCE TO RELATED APPLICATIONS

This is a continuation of international application serial no. PCT/US2024/021635 filed on Mar. 27, 2024, which claims the benefit of priority to U.S. provisional application Ser. No. 63/454,807 filed on Mar. 27, 2023, both of which are incorporated herein by reference in their entireties for all and any purposes.

BACKGROUND

The disclosure relates generally to a system and method for vehicle charging. The disclosure relates more specifically to a system and method adapted to vehicle charging on or near the water.

U.S. Pat. No. 10,933,958 describes an electric energy generation and storage buoy, which can be used for autonomous marine applications.

U.S. Pat. No. 11,258,105 describes a subsurface marine battery pack, which can be used for powering seafloor payloads.

Despite these advances, there is a need in the art for a system and method adapted for vehicle charging on or near the water.

SUMMARY

The disclosure describes a Charging Station and Shore Station system for charging electric vehicles. These electric vehicles include autonomous vehicles, remotely operated vehicles, and manually operated vehicles. The Charging Station and Shore Station system is specifically adapted to vehicle charging on or near the water. The Charging Station and Shore Station system can be completely offshore, or the system can be at least partially quayside. The Charging Station and Shore Station system can be in or near any body of water (lake, river, intercoastal waterways, open ocean).

The Charging Station includes receptacles (e.g., water resistant receptacles) that are assembled around an aquatic structure (e.g., buoy, oil platform, offshore wind turbine, marine construction, other buoyant or submersed construction) deployed on or near any body of water. The Charging Station may be fully submerged, floating on the surface, or both. The Charging Station may also be on or near the shore and/or attached to the ground/seabed. In particular, the Charging Station may be able to submerge its topsides periodically and/or on-demand/by command. This capability would allow the Charging Station to make itself safe in extreme storm conditions and/or, in military applications, to hide itself in the presence of a malicious actor.

The receptacles of the Charging Station house:
  a means for an electric vehicle to find it (e.g., via a signal of some type, via a marker);
  an energy storage coupled with a means to renew/recharge the energy storage;
  a means to hold the electric vehicle connected to the energy storage during charging;
  a means to transfer that power to the electric vehicle; and
  an optional communication means, such as for the electric vehicle to communicate with the Charging Station and/or for the Charging Station to communicate with the Shore Station.

Generally, the means for an electric vehicle to find the Charging Station are dependent on the capabilities of the electric vehicle. In particular, the means for an electric vehicle to find the Charging Station may include a known signal emitter for the Charging Station to broadcast a homing signal (optical, RF, sound, Electromagnetic) and then for the electric vehicle to use the signal to "find" the Charging Station. It is contemplated that, in some cases, the signal may provide knowledge of the location of the Charging Station to the electric vehicle (or to the electric vehicle operator). Alternatively, or additionally, the platform of the Charging Station may provide a visible marker for the electric vehicle to "see" the Charging Station and drive itself to it.

The energy storage and the means to renew/recharge the energy storage are typically contained in one or more receptacles. For example, the energy storage can include batteries or some other equivalent means to store the energy generated. The renewed/recharging power can be generated by a renewable energy source: wave, wind, solar, or a combination thereof. Alternatively, or additionally, the renewed/recharging power can be generated by a non-renewable source: diesel, gasoline, or other combustible. The energy storage is preferably coupled with the means to renew/recharge the energy storage via an electronic system configured to manage the charging/energy storage.

In some embodiments, the means to hold the electric vehicle connected to the energy storage during charging generally allows for the electric vehicle to "fly" or "swim" near the platform of the Charging Station and be connected thereto while preferably avoiding grabbing, or rigidly fastening the electric vehicle to the aquatic structure of the Charging Station. For example, the electric vehicle can press itself against a buoy using its own motors and not be fastened. In particular, the means to hold the electric vehicle connected to the energy storage during charging may include a mechanical connection such as a flexible link (e.g., a chain, a mooring line, or equivalent connector) and a hook-like member to connect to the electric vehicle. Alternatively, or additionally, the means to hold the electric vehicle connected to the energy storage during charging can include a flexible link and a clamp-like member that can swim up (e.g., via propulsion) on a surface vehicle, land on an aerial vehicle, or land on a subsea vehicle. Alternatively, or additionally, the means to hold the electric vehicle connected to the energy storage during charging can include a flexible link and a cage-like member or equivalent into which surface and subsea vehicles can swim.

In other embodiments, the means to hold the electric vehicle connected to the energy storage during charging generally allows for the electric vehicle to be grabbed or rigidly fastened the electric vehicle to the aquatic structure of the Charging Station.

In some examples, power can be transferred by plugging in the electric vehicle. In these examples, a robotic arm can grab a cable coupled to the Charging Station with a connector on it and plug the electric vehicle in. This plugging can be initiated by the Charging Station or by the electric vehicle, depending on the capabilities of the Charging Station and the electric vehicle. In some examples, power can be transferred by inductive charging, where an inductive charging pad coupled to the Charging Station mates up with a similar pad on the electric vehicle. The pads can be held together with magnets or by having the electric vehicle press itself against the aquatic structure of the Charging Station with its motors.

Optionally, the Charging Station may provide communications between itself and the Shore Station. For example, the Charging Station can transfer its own status and health information as well as its own sensor data depending on how the Charging Station is instrumented (e.g., with its own sensors or not). Charging Station to Shore Station communications can be wireless (e.g., Cell or LTE, Wi-Fi, Satcom), or the data can be offloaded periodically by hand (e.g., by an operator going to the Charging Station and offloading the data). Also, the Charging Station may provide communications between itself and the electric vehicle via a wire (e.g., through a plug) or wireless (e.g., via Wi-Fi, Bluetooth, etc.). Finally, the Charging Station can act as a relay where it transfers the status and health information of the electric vehicle as well as any data collected by vehicle sensors (e.g., mission data).

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention.

BRIEF DESCRIPTION OF THE DRAWINGS

For a more detailed description of the embodiments of the present disclosure, reference will now be made to the accompanying drawings, wherein.

As is customary, the drawings may not be drawn to scale for the sake of clarity.

DETAILED DESCRIPTION

Figure 1:
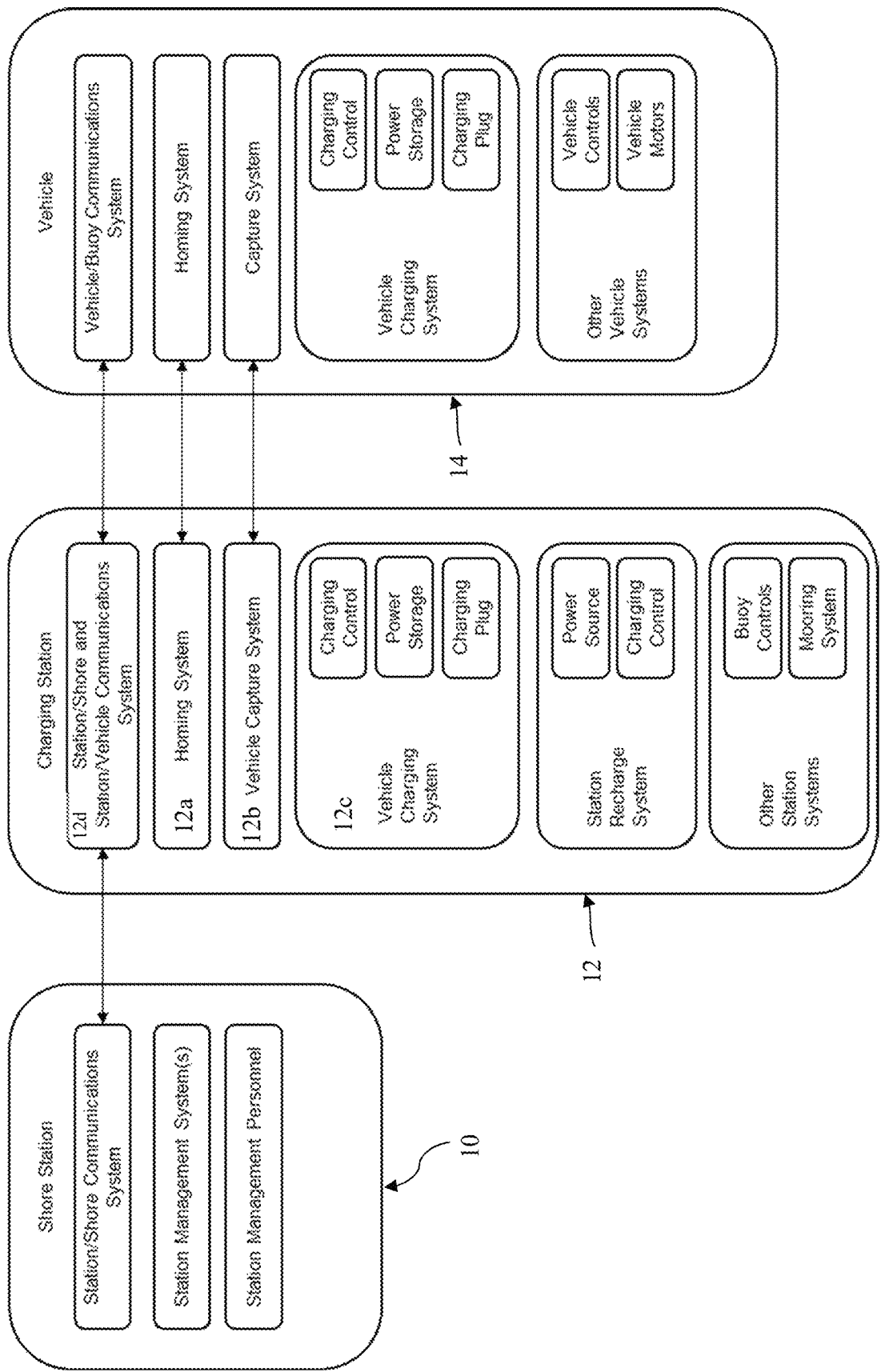
FIG. 1 is a schematic view of a system including a Shore Station and a Charging Station that are used for charging electric vehicles.

In reference to FIG. 1, a preferred embodiment of a system including Charging Station 12 and Shore Station 10 is illustrated, wherein the system is used for charging an electric boat 14. In this example, the Charging Station 12 includes an aquatic structure in the form of a PowerBuoy® moored to the seabed (available from Ocean Power Technologies) with a combination of wave, wind, and solar power generators (either wind and solar or wind, solar and wave). Charging of the internal batteries is preferably continuous. A plurality of water-proof receptacles are assembled around and connected to the PowerBuoy®.

In the example shown, the Charging Station 12 includes a water-proof receptacle 12a housing a homing system (e.g., radar or similar) for the electric boat 14 to find it and swim into the capture system. Note that the electric boat 14 (its pilot or autopilot) may also have knowledge of the general location of the Charging Station 12.

The Charging Station 12 includes a receptacle 12b housing a means to hold the electric vehicle connected to the energy storage during charging, also referred to in this example as a vehicle capture system. For floating vehicles, such as the electric boat 14, the means to hold the electric vehicle connected to the energy storage during charging preferably includes a flexible link and hook or other equivalent connection. However, in other embodiments, such as for aerial vehicles, the means to hold the electric vehicle connected to the energy storage during charging may include a landing pad with some form of a clamp to hold the electric vehicle in place. Further, for underwater vehicles, the means to hold the electric vehicle connected to the energy storage during charging may include a landing pad or cage for the electric vehicle to swim onto/into with some form of a clamp to hold the electric vehicle in place.

The Charging Station 12 includes a receptacle 12c housing a means to transfer that power to the electric vehicle, illustrated as a charging plug in this example. However, the charging is preferably performed via inductive charging, where the electric vehicle swims close and is then pulled into direct contact with an inductive charging pad or plate.

Once connected, the electric boat 14 charges and exchanges data with both the Charging Station 12 and Shore Station 10. For example, the electric boat 14 can exchange data with the Shore Station 10 through the Charging Station 12, with the Charging Station 12 acting as a relay. Alternatively, the electric boat 14 can exchange data with the Shore Station 10 directly. This direct exchange of data with the Shore Station 10 may only be available for surface and aerial vehicles. In other embodiments, such as with underwater vehicles, the exchange of data with the Shore Station 10 is likely to use the Charging Station 12 as a relay. This optional functionality is provided with a combination of communication means housed in the receptacle 12d of the Charging Station 12, communication means in the Shore Station 10, and communication means in the electric boat 14.

Once the electric boat 14 is charged, it will command the Charging Station 12 to release the means to hold the electric vehicle connected to the energy storage, and the electric boat 14 will depart. The electric boat 14 could also remain in place until it is ordered to do a task, at which point the electric boat 14 would command the Charging Station 12 to release the means to hold the electric vehicle connected to the energy storage, allowing the electric boat 14 to depart.

Figure 2:
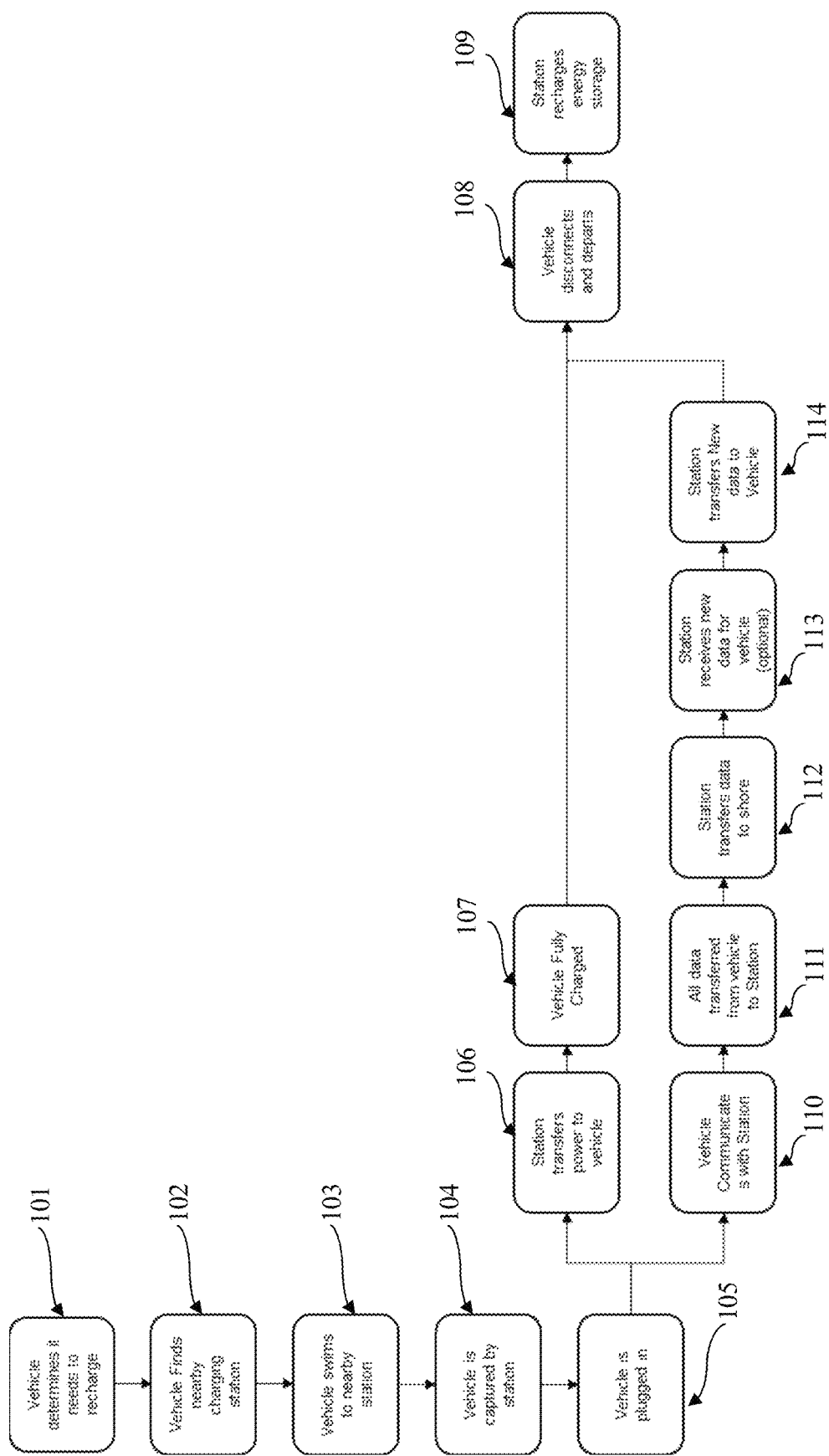
FIG. 2 is a flowchart of a method for charging electric vehicles which may employ the system shown in FIG. 1.

In reference to FIG. 2, a preferred embodiment of a method for vehicle charging is illustrated.

At step 101, a vehicle determines it needs to recharge. Alternatively, if the electric vehicle is not "smart" enough to determine its own state of charge, this information could come from an operator (e.g., a remote operator or a manual operator).

At step 102, the electric vehicle finds a nearby Charging Station (e.g., the Charging Station 12 shown in FIG. 1). As in step 101, information about the location of a nearby Charging Station can come from a Shore Station (e.g., the Shore Station 10 shown in FIG. 1) or a nearby Charging Station. For example, the Shore Station could push a location to the electric vehicle, and the electric vehicle simply travels to that location.

At step 103, the electric vehicle swims to the nearby Charging Station.

At step 104, the electric vehicle is held connected to the energy storage of the nearby Charging Station. There are many ways to perform this step. In one example, a buoy has some form of mechanical, magnetic, or other means to "hold" the electric vehicle in place. In another example, this step can be performed by the electric vehicle, whereby the electric vehicle attaches itself to the Charging Station (via a hook, robotic arm, magnet, etc.). In yet another example, the electric vehicle swims up to and presses itself against the Charging Station with the force of its motors.

At step 105, the electric vehicle is plugged in. Again, there are many ways to perform this step. In one example, a male/female type of plug is used. The electric vehicle may swim into the plug, or the Charging Station may pull the electric vehicle into the plug. In another example, the electric vehicle (or potentially the Charging Station) has an electromechanical robotic arm that plugs the electric vehicle in. In another example, inductive charging is used: two pad surfaces touch together, each pad having an inductive coil in it, and electric energy is transferred.

At step 106, the Charging Station transfers power to the electric vehicle.

At step 107, the electric vehicle is fully charged.

At step 108, the electric vehicle disconnects and departs. Depending on the capabilities of the electric vehicle, the Charging Station may release the electric vehicle (opening a clamp or releasing some kind of hook, etc.), or the electric vehicle may release itself from the Charging Station. For example, underwater vehicles may swim into a cage-like member and swim back out when ready.

At step 109, the Charging Station recharges its energy storage (e.g., battery). Though shown at the end, this step can be performed continuously throughout the entire method. Also, though the preferred solution uses batteries to store the energy, there are other alternatives to store energy, including supercapacitors and other energy storage mechanisms.

In parallel to steps 106 and 107, the method can perform steps 110, 111, 112, 113, and 114. For these steps, it is possible that the electric vehicle is capable of communicating directly with the Shore Station, so communication via the Charging Station may be omitted.

At step 110, the electric vehicle communicates with the Charging Station.

At step 111, all data are transferred from the electric vehicle to the Charging Station.

At step 112, the Charging Station transfers the data to the Shore Station.

At optional step 113, the Charging Station receives new data (e.g., mission data) for the electric vehicle.

At optional step 114, the Charging Station transfers the new data to the electric vehicle.

Additionally, the disclosure also contemplates at least the following embodiments 1 to 14. It should be noted that any element of these embodiments may further include details related to this element that are disclosed in a paragraph or Figure describing the preferred embodiments without necessarily including details of other elements that are disclosed in the same or other paragraph or Figure.

Embodiment 1

Embodiment 1 is a system for charging electric vehicles on or near water. The system comprises a charging station and, optionally, a shore station.

The charging station comprises an aquatic structure (i.e., a structure entirely or partially submerged into any body of water, optionally but not necessarily floating on the surface of the body of water). The aquatic structure is attached and/or moored to a shore and/or the ground/bed of the body of water, and receptacles are assembled around the aquatic structure and connected to it.

The receptacles are preferably all water-proof, and collectively house:
- a means for an electric vehicle to find the charging station;
- an electric energy storage coupled with a means to recharge the energy storage;
- a means to hold the electric vehicle connected to the energy storage during charging; and
- a means to transfer electric energy to the electric vehicle.

Optionally, the receptacles also house communication means, for example, communication means with the shore station.

If provided, the shore station is remote and mechanically disconnected from the charging station. The shore station is at least partially, if not entirely, above water and attached to the shore of the body of water, for example to a quayside. The shore station includes communication means that complement the communication means of the charging station.

Embodiment 2

Embodiment 2 is a system as described in embodiment 1 wherein the charging station includes one of a landing pad, or a docking pad or buoy configured to contact the electric vehicle. Optionally, the landing pad, or the docking pad or buoy is further configured to be propelled in water toward a surface of the electric vehicle.

Embodiment 3

Embodiment 3 is a system as described in embodiments 1 or 2 the means to hold the electric vehicle connected to the energy storage during charging includes a flexible link and one of a hook, clamp, and cage member capable of capturing the electric vehicle.

Embodiment 4

Embodiment 4 is a system as described in any of embodiments 1 to 3, wherein the means for an electric vehicle to find the charging station includes one or more of an electromagnetic signal emitter and/or a visible marker.

Embodiment 5

Embodiment 5 is a system as described in any of embodiments 1 to 4 wherein the electric energy storage is coupled with the means to recharge the energy storage via an electronic system configured to manage the charging and energy storage.

Embodiment 6

Embodiment 4 is a system as described in any of embodiments 1 to 5 wherein the means to transfer electric energy to the electric vehicle includes a pad having an inductive coil in it, the pad having a surface shaped to touch a corresponding pad surface on the electric vehicle.

Embodiment 7

Embodiment 7 is an implant as described in any of embodiments 1 to 5 wherein the means to transfer electric energy to the electric vehicle includes a robotic arm, a cable coupled to the charging station and a connector on the cable configured to plug the electric vehicle in.

Embodiment 8

Embodiment 8 is a method for charging electric vehicles on or near water. The method comprises providing a system as described in any of embodiments 1 to 7. The method comprises the steps of causing an electric vehicle to find the charging station, holding the electric vehicle connected to the energy storage during charging, transferring electric energy to the electric vehicle, and recharging the energy storage.

Optionally, the method may also comprise the step of causing the charging station to communicate its own status and health information (e.g., charge level) to the shore station.

Optionally, the method may also comprise the steps of causing the electric vehicle to communicate its own status, health information (e.g., charge level), and/or sensor data to the charging station, and causing the charging station to relay the status, health information) and/or sensor data of the electric vehicle to the shore station.

Optionally, the method may also comprise the steps of causing the charging station to receive new data from the shore station and causing the charging station to transfer the new data to the electric vehicle.

Embodiment 9

Embodiment 9 is a method as described in embodiment 8 wherein causing the electric vehicle to find the charging station is performed by one or more of emitting a homing signal or displaying a visible marker on the aquatic structure of the charging station.

Embodiment 10

Embodiment 10 is a method as described in embodiments 8 or 9, further comprising managing the charging and energy storage with an electronic system coupling the electric energy storage with the means to recharge the energy storage.

Embodiment 11

Embodiment 11 is a method as described in any of embodiments 8 to 10 wherein transferring electric energy to the electric vehicle is performed by induction or, alternatively, by conduction.

Embodiment 12

Embodiment 12 is a method as described in any of embodiments 8 to 11, further comprising submerging topsides of the receptacles.

Embodiment 13

Embodiment 13 is a method as described in embodiment 12 wherein submerging the topsides is performed by command.

Embodiment 14

Embodiment 14 is a method as described in embodiment 12 wherein submerging the topsides is performed periodically.

What is claimed is:

1. A system for charging electric vehicles on or near water, the system including a charging station comprising:
    an electric energy storage coupled with a means to recharge the energy storage; a means for an electric boat to find the charging station;
    a signal emitter configured to broadcast a signal, wherein the signal includes a location of the charging station;
    a means to hold the electric boat connected to the energy storage during charging;
    a means to transfer electric energy to the electric boat; and
    an aquatic structure adapted to float on a body of water and being attached to a shore, ground, or bed of the body of water; and
    one or more receptacles connected to the aquatic structure and adapted to float on the body of water,
    wherein at least some of the means for an electric boat to find the charging station, the electric energy storage, and the means to recharge the energy storage are mounted to the aquatic structure;
    wherein at least some of the means for an electric boat to find the charging station, the means to hold the electric boat connected to the energy storage during charging, and the means to transfer electric energy to the electric boat are housed in the one or more receptacles; and
    wherein the means to hold the electric boat connected to the energy storage during charging includes a flexible link and one of a hook, clamp, and cage member capable of capturing the electric boat, wherein the one of a hook, clamp, and cage member can move in water via propulsion.

2. The system of claim 1, wherein the aquatic structure and one or more receptacles are selectably submerged in the body of water.

3. The system of claim 1, further comprising a shore station located at least partially above the body of water and disconnected from the charging station, wherein the charging station and the shore station include communication means that are communicatively coupled to one another to enable transfer of data from the charging station to the shore station.

4. The system of claim 3, further comprising a means to transfer data between the charging station and the electric boat.

5. The system of claim 1, further comprising a means to transfer data directly between a shore station and the electric boat.

6. The system of claim 1, wherein the means to transfer electric energy to the electric boat includes a pad having an inductive coil in it, the pad having a surface shaped to touch a corresponding pad surface on the electric boat.

7. The system of claim 1, wherein the means to transfer electric energy to the electric boat includes a robotic arm, a cable coupled to the charging station and a connector on the cable configured to plug into the electric boat.

8. The system of claim 1, wherein the means to recharge the energy storage continuously charges the electric energy storage.

9. The system of claim 1, wherein the means to hold the electric boat connected to the energy storage during charging includes the flexible link and a clamp capable of capturing the electric boat.

10. The system of claim 1, wherein the means to hold the electric boat connected to the energy storage during charging includes the flexible link and a cage member capable of capturing the electric boat.

11. The system of claim 1, wherein the signal emitter is capable of broadcasting the signal to an electric boat.

12. A method for charging electric boats on the water, the method comprising:
    providing a charging station including:
        an electric energy storage coupled with a means to recharge the energy storage;

a signal emitter configured to broadcast a signal, wherein the signal includes a location of the charging station;

a means to hold the electric boat connected to the energy storage during charging;

a means to transfer electric energy to the electric boat; and an aquatic structure adapted to float on a body of water and being attached to a shore, ground, or bed of the body of water; and one or more receptacles connected to the aquatic structure and adapted to float on the body of water, wherein at least some of the means for an electric boat to find the charging station, the electric energy storage, and the means to recharge the energy storage are mounted to the aquatic structure; and wherein at least some of the means for an electric boat to find the charging station, the means to hold the electric boat connected to the energy storage during charging, and the means to transfer electric energy to the electric boat are housed in the one or more receptacles;

broadcasting a position of the charging station with the signal emitter;

holding the electric boat connected to the energy storage during charging; and transferring electric energy to the electric boat;

wherein the means to hold the electric boat connected to the energy storage during charging includes a flexible link and one of a hook, clamp, and cage member capable of capturing the electric boat, wherein the one of a hook, clamp, and cage member can move in water via propulsion.

13. The method of claim 12, further comprising transferring data from the electric boat to a shore station.

14. The method of claim 13, further comprising
providing a shore station physically disconnected from the charging station, wherein the charging station and the shore station include communication means that are communicatively coupled to one another;
causing the charging station to communicate its own status and a charge level to the shore station.

15. The method of claim 14, further comprising causing the charging station to receive new data from the shore station.

16. The method of claim 12, further comprising submerging the aquatic structure and at least one of the one or more receptacles in the body of water.

17. The method of claim 12, further comprising continuously charging the electric energy storage coupled with the means to recharge the energy storage.

18. The method of claim 12, wherein the means to hold the electric boat connected to the energy storage during charging includes the flexible link and a clamp capable of capturing the electric boat.

19. The method of claim 12, wherein the means to hold the electric boat connected to the energy storage during charging includes the flexible link and a cage member capable of capturing the electric boat.

20. The method of claim 12, wherein the signal emitter is capable of broadcasting the signal to an electric boat, the method comprising broadcasting the location of the charging station to the electric boat.

21. The method of claim 14 comprising causing the charging station to communicate the location of the charging station to the shore station.

22. A charging station for charging electric boats comprising:

a signal emitter configured to broadcast a signal, wherein the signal includes a location of the charging station;

a battery coupled with a power generator;

an inductive charging pad coupled to the battery and configured to electrically connect with the electric boat;

a mooring system capable of holding the electric boat connected to the inductive charging pad;

an aquatic structure adapted to float on a body of water and being attached to a shore, ground, or bed of the body of water; and one or more receptacles connected to the aquatic structure and adapted to float on the body of water, wherein at least some of the signal emitter, the battery, and the power generator are mounted to the aquatic structure;

wherein at least some of the signal emitter, the mooring system, and the inductive charging pad are housed in the one or more receptacles; and wherein the inductive charging pad can move in water via propulsion.

23. The charging station of claim 22, wherein the aquatic structure and the one or more receptacles are adapted to be selectably submerged in the body of water.

24. The charging station of claim 22, further comprising a shore station disconnected from the charging station, wherein the charging station and the shore station are communicatively coupled to one another to enable transfer of data from the charging station to the shore station.

25. The charging station of claim 22, wherein the mooring system includes a flexible link and one of a hook, clamp, and cage member capable of capturing the electric boat.

26. The charging station of claim 22, wherein the power generator is adapted to generate power from wave motion.

27. The charging station of claim 22 wherein the signal emitter is capable of broadcasting the signal to an electric boat.

* * * * *